Oct. 28, 1969  R. P. RHODES ET AL  3,475,162
THERMAL PROCESS FOR THE PRODUCTION OF MAGNESIUM
Filed Oct. 19, 1966
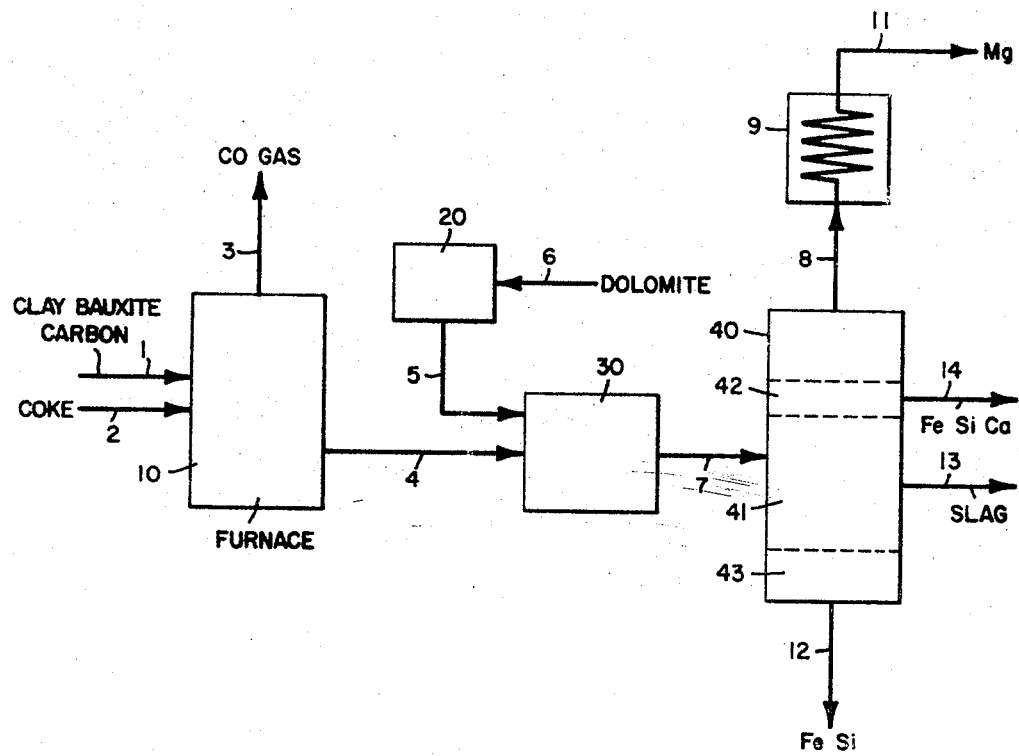
R. P. RHODES
A. C. FROST   INVENTORS
BY W. O. T Heilman
PATENT ATTORNEY

United States Patent Office 3,475,162
Patented Oct. 28, 1969

3,475,162
THERMAL PROCESS FOR THE PRODUCTION
OF MAGNESIUM
Richard P. Rhodes, Roselle, and Albert C. Frost, Elizabeth, N.J., assignors to Esso Research and Engineering Company, a corporation of Delaware
Filed Oct. 19, 1966, Ser. No. 587,831
Int. Cl. C22b 45/00, 5/04
U.S. Cl. 75—67                    1 Claim

ABSTRACT OF THE DISCLOSURE

Magnesium is recovered from calcined dolomite by mixing the dolomite with a particular aluminum-silicon-iron alloy and then reacting the mixture at about atmospheric pressure at a temperature in the range from about 1575° to 1700° C.

Vaporous magnesium and molten ferro silicon are recovered from the reaction zone.

---

The present invention is broadly concerned with the production of high quality magnesium. The invention is especially concerned with the thermal treatment of magnesium oxide utilizing a particular technique and apparatus wherein magnesium is continuously produced by the condensation of magnesium vapor. The invention is more particularly concerned with a process for the simultaneous production of magnesium and silicon, particularly ferro-silicon.

It is known in the art that present thermal methods for the production of magnesium are slow batch operations and wherein a high vacuum is required. These methods are not suitable for operation on a scale large enough to compete with the electrolytic cell methods for the production of magnesium. The present invention is based upon the discovery that magnesium vapor may be readily distilled and recovered and that silicon may be simultaneously produced providing the reactants and the reacting conditions are controlled within critical limits.

In accordance with the present invention aluminum oxide, iron oxide, silica and calcined dolomite and coke are interreacted under temperature and pressure conditions in an integrated process so as to produce magnesium metal and a ferro-silicon alloy. A further adaptation of the present invention is to produce also an iron-silicon-calcium phase which phase may be subsequently treated to separate the respective elements.

The present invention may be fully understood by reference to the diagrammatical flowplan illustrating one embodiment of the same. Referring specifically to the drawing, a mixture of aluminum oxide, iron oxide and silicon oxide is introduced into alloy furnace 10 by means of line 1. Alloy furnace 10 may comprise a conventional electric arc furnace. Carbon is introduced into furnace 10 by means of line 2. Reaction products are removed from furnace 10 by means of line 3 while an aluminum-silicon-iron alloy is removed from furnace 10 by means of line 4. The temperature in furnace 10 is maintained in the range from about 1800° C. to 2500° C., preferably about 2200° C. The pressure in alloy furnace 10 is in the range from about 0.5 to 2 atmospheres preferably about 1 atmosphere.

The reactants are added to furnace 10 are added in amounts so as to produce an alloy comprising about 40 to 90% by weight of aluminum, about 65 to 10% by weight of silicon and about 1 to 20% by weight of iron. A preferred alloy consists of about 65% by weight of aluminum, about 30% by weight of silicon and about 5% by weight of iron. Satisfactory reactants for feed to alloy furnace 10 are clay, bauxite and carbon.

The alloy removed by means of line 4, comprising aluminum, silicon and iron, is passed to milling-briquetting zone 30 wherein the same is ground and briquetted with calcined dolomite which is introduced into zone 30 by means of line 5. Calcined dolomite is produced by introducing dolomite (calcium carbonate and magnesium carbonate) into calcining zone 20 by means of line 6. The calcined dolomite introduced into milling and briquetting zone 30 comprises about 55 to 65% by weight of calcium oxide and about 45–35% by weight of magnesium oxide. The amount of calcined dolomite introduced into zone 30, as compared with the amount of aluminum-silicon-iron alloy introduced into zone 30 is about 3.0 to 12.0 parts by weight of dolomite to 1 part by weight of alloy. A preferred amount of dolomite used in zone 30 with respect to the amount of alloy used is about 5.5 parts by weight of dolomite per 1 part by weight of alloy.

Briquettes of the composition described are removed from milling and briquetting zone 30 by means of line 7 and introduced into reduction furnace 40. Reduction furnace 40 is maintained at a pressure in the range of 0.5 to 2.0 atmospheres, preferably about 1 atmosphere. Under one method of operation, the temperature in reduction furnace 40 is maintained in the range from about 1575° C. to 1700° C., preferably about 1625° C. The slag phase 41 in reduction furnace 40 comprises aluminum oxide, calcium oxide and silicon oxide. When the briquettes are introduced into the slag phase 41 they melt and form discrete particles of alloy in slag phase 41. These discrete particles are a miscible metal phase of aluminum, silicon and iron.

Under these conditions the aluminum reacts with calcium oxide to form aluminum oxide in the slag and the calcium replaces the aluminum in the discrete particles of the metal phase. This latter metal phase of iron, silicon and calcium may separate, if the slag density is sufficient to yield an upper metal phase 42. The calcium then reacts with the magnesium oxide to form calcium oxide which is segregated in the slag 41 and vaporous magnesium which is moved overhead from reduction furnace 40 by means of line 8. This magnesium is condensed in zone 9 and removed from the system as magnesium metal by means of line 11.

Due to the fact that the calcium in phase 42 is removed by reacting with the magnesium oxide, a phase of iron and silicon 43 forms at the bottom of reaction zone 40. Thus, a ferro-silicon phase 43 comprising from about 30–50% silicon and 70–50% iron may be withdrawn from zone 40 by means of line 12 and utilized as desired in the steel industry or may be further treated to segregate pure iron and pure silicon. The slag is removed from reduction furnace 40 by means of line 13 and handled as desired while a ferro-silicon-calcium phase may be withdrawn by means of line 14 and further handled to segregate the respective elements.

Under certain conditions it may be desirable to stage the operation in a manner that the first stage in the reaction zone is conducted at a temperature in the range from about 1500° to 1600° C., such as about 1575° C. Under these conditions, a slag phase will be secured and an upper phase comprising iron, silicon and calcium. However, the reaction with respect to calcium reacting with the magnesium oxide will be relatively slow thereby producing a minimum of vaporous magnesium and a minimum of a phase of iron and silicon. Thus, the present process by adjusting time and temperature factors may readily adjust the amounts of the respective products secured.

What is claimed is:

1. Process for the production of magnesium and ferrosilicon which comprises mixing an alloy consisting of about 65% by weight of aluminum, about 30% by weight of silicon and about 5% by weight of iron with about 5.5 parts by weight of dolomite per one part by weight of alloy, thereafter subjecting the mixture in a reaction zone to a temperature in the range from about 1575° to 1700° C. and at a pressure in the range from about 0.5 to 2.0 atmospheres under conditions to secure a top liquid phase comprising iron, silicon and calcium, an intermediate slag phase comprising aluminum oxide, calcium oxide and silica, and a lower phase comprising ferro-silicon, removing vaporous magnesium overhead and recovering the same and removing the ferro-silicon from said reaction zone and recovering the same.

References Cited

UNITED STATES PATENTS

| | | | |
|---|---|---|---|
| 1,239,178 | 9/1917 | Grosvenor | 75—67 X |
| 1,311,380 | 7/1919 | Bleecker et al. | 75—67 |
| 2,396,658 | 3/1946 | Hybinette et al. | 75—67 |
| 2,805,935 | 9/1957 | Camescasse | 75—67 |
| 2,971,833 | 2/1961 | Artru et al. | 75—67 X |

FOREIGN PATENTS 545,458  5/1942  Great Britain.

L. DEWAYNE RUTLEDGE, Primary Examiner

HENRY W. TARRING II, Assistant Examiner

U.S. Cl. X.R.

75—10, 129, 135